Nov. 11, 1958 C. C. HUGHES Re. 24,562

CONSTRUCTION OF CIRCULAR SAWS

Original Filed July 1, 1954

INVENTOR.
CLYDE C. HUGHES
BY
ATTORNEY.

United States Patent Office

Re. 24,562

Reissued Nov. 11, 1958

24,562

CONSTRUCTION OF CIRCULAR SAWS

Clyde C. Hughes, Arcadia, Calif., assignor to Hughes Blades, Inc., Pasadena, Calif., a corporation of California Original No. 2,763,258, dated September 18, 1956, Serial No. 440,634, July 1, 1954. Application for reissue July 3, 1958, Serial No. 747,558

15 Claims. (Cl. 125—15)

Matter enclosed in heavy brackets [ ] appears in the original patent but forms no part of this reissue specification; matter printed in italics indicates the additions made by reissue.

This invention is directed to improvements in circular saw construction and is particularly directed to circular saws provided with a metallic circular, disc-like core of substantially uniform thickness provided with an interrupted external edge, the segments of such edge being provided with cutting or abrading segments or elements. In accordance with the invention herein disclosed means are provided for increasing the life of such saws, for increasing the rapidity with which cuts can be made therewith and for preventing the individual cutting elements or segments from being separated from the core by the abrading and wearing effect of cuttings.

Although the invention may be applied to a great variety of circular saws having cutting elements of various types, it is of particularly utility when applied to circular saws provided with cutting segments composed of or containing diamonds or diamond chips. One form of a saw greatly benefited by the construction of this invention employs diamond impregnated segments (made of diamonds and powered metal, suitably compressed and sintered to form a cutting element), these diamond impregnated cutting elements being then soldered or brazed onto the edge of the saw. Because of the cost of these diamond impregnated cutting segments, it is essential that their life be prolonged and that the core be capable of properly supporting these segments throughout their entire life.

Circular saws provided with diamond impregnated segments are used extensively in cutting grooves or slots in concerete, such grooves or slots then acting as expansion or contraction joints. It has been found desirable to cut such grooves in concrete within a period of from about 6 to 24 hours after the concrete has been cast or poured. In most instances the freshly poured concrete has experienced its initial set, but not its final set, at the time the cuts are made therein. The concrete is therefore somewhat spongy, and it is more difficult to cut through partially set concrete than a fully set, dry concrete. Although water is used as a lubricant and for the purpose of removing the cuttings, it must be remembered that the concrete contains very hard aggregate and sand as well as the cementing compounds. The fine, sharp-edged particles of sand and stone exert a pronounced and disastrous abrasive effect upon the disc-like core of the saws. The abrasive effect becomes most evident in the zone immediately adjacent the juncture of the diamond impregnated segment and the disc-like core, reducing the thickness of the core to such an extent that the segments break off rendering the saw useless. It is believed that most of this abrasion and wear is caused by small particles of sand and rock which appear to be retained or massed within the kerf and radially inward from the cutting segments.

An object of this invention therefore is to disclose and provide a saw construction including means whereby cuttings are agitated and expelled from the kerf, thereby reducing and minimizing the wear of the core normally occasioned by such cuttings.

A further object of the invention is to disclose and provide a circular saw comprising a disc-like core of suitable uniform thickness, cutting segments carried by the edge of such core, and means carried by the core adjacent the segments and projecting from the surfaces of the core for agitating and discharging cuttings.

The saw illustrated comprises a disc-like circular core 10 provided with a central arbor or opening 13. The core 10 is of virtually uniform thickness and has planar sides or surfaces 11 and 12. The circumferential edge of this core is periodically interrupted by radial slots such as slots 14, 15, 16 and the like. The slots may be of uniform width or they may terminate in enlarged areas or openings so as to resemble keyholes, with the larger openings directed towards the axis of rotation of the core.

The edge of the core carries cutting elements or segments such as 17, 18, 19 and the like. For use in the concrete cutting field these segments are made from a mixture of powdered metal and whole diamond bort or crushed diamonds compressed and sintered together. These preformed cutting elements are then attached to the edge of the core 10 by means of a solder or by being brazed thereto, a silver solder is indicated at 20.

Figure 4:
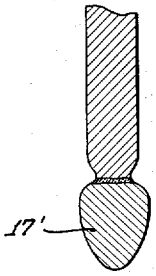
Fig. 4 is a transverse fragmentary view taken in the same plane as Fig. 2 illustrating wear on a saw construction not embodying this invention.

It has been found that in actual practice these saws rapidly wear in a zone immediately adjacent the inner or soldered edge of each of the cutting segments so as to resemble in cross section the outline illustrated in Fig. 4. It will be noted that the wear is most pronounced above the layer of solder thereby weakening the core and permitting the entire segment 17' to break off.

Figure 1:
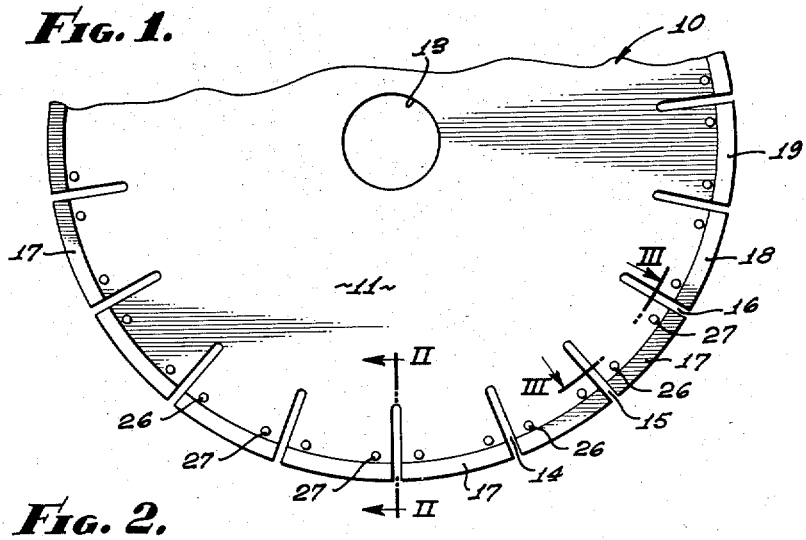
Fig. 1 is a side elevation of a circular saw embodying one form of the present invention.
Figure 2:
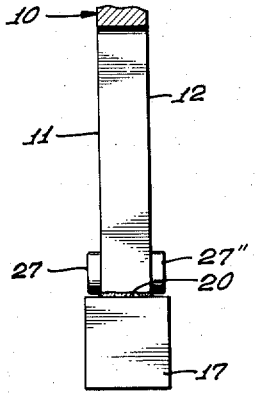
Fig. 2 is an enlarged radial section taken along the plane indicated by line II—II of Fig. 1.
Figure 3:
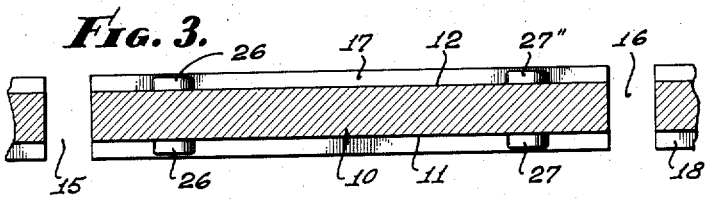
Fig. 3 is a section taken along the plane III—III of Fig. 1.

In accordance with the present invention, pins, studs, buttons or inserts such as 26 and 27 are placed on the surfaces 11 and 12 of the core immediately adjacent the edge and the cutting element or segment 17, these buttons projecting above the surface of the core a distance equivalent to the thickness of the cutting segment 17 as indicated in Fig. 2. It will be remembered that cores of a standard thickness, say 0.1 inch may carry segments which are 0.15" to 0.25" thick. The buttons or studs 26, 27 should have their opposing faces spaced a distance substantially equivalent to the thickness of the cutting segment. One or more of these buttons may be carried above each of the segments 17, 18 and the like. In practice it has been found desirable to have the buttons, studs or inserts adjacent the radial edges of the inwardly extending slots such as the slots 14, 15, 16 and the like.

The agitating buttons or studs 26, 27, etc., are preferably made of metal although in some instances the use of rubber or rubber composition has been found satisfactory. It is to be noted that even though the core of the saws is made of steel having a Rockwell C hardness of 28–32, the abrasive particles of sand and stone rapidly wear the steel away. The circumferentially spaced buttons or studs also exhibit wear (when made from metal) but not to the same extent, and moreover, such buttons even though widely spaced, actually prevent the wear of the core between such buttons on the same side of the core. The buttons, studs or inserts appear to act as agitating means which prevent the cuttings from compacting and instead discharge and flush the cuttings from the kerf. Rubber composition buttons appear to resist wear and also function as agitating and scavaging means.

Figure 5:
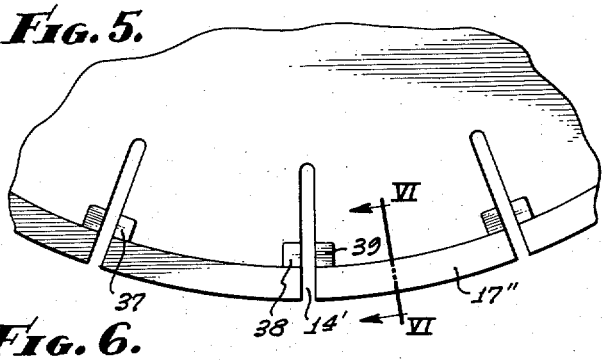
Fig. 5 is a fragmentary side view of a circular saw embodying a modification of this invention.
Figure 6:
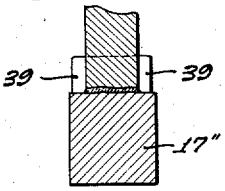
Fig. 6 is a fragmentary transverse section taken in the plane indicated by line VI—VI of Fig. 5.

The modified form of construction illustrated in Figs. 5 and 6 contemplates the use of inserts 37, 38, 39 made of hard metal, these inserts being positioned in apertures or recesses formed in the core adjacent each of the radially extending slots such as the slot 14'. Each of these inserts, such as the insert 38, is thicker than the thickness of the core and projects beyond each of the parallel planar surfaces of the core (in much the same way that the buttons 27 and 27'' project). By placing the inserts so that one face of each insert is in alignment with a wall of the radial slot, wear of the core at the face of such slot is prevented or greatly minimized so that the full effectiveness and life of the cutting segment 17'' is attained.

The agitating means herein disclosed whether they are inserts, buttons, studs or the like may be connected to the core in a great variety of manners as by brazing, by being press fitted into suitable apertures formed in or adjacent the edge of the core, by being deposited upon the surfaces of the core from suitable welding rods, or by being welded to the surfaces of the core. Stellite, tungsten carbide or other surfacing, facing and hardened cutting metals may be applied.

It will thus be understood by those skilled in the art that the action of the agitating buttons 26, 27 deflects cuttings away from the juncture of the core and cutting segment, flushing the cuttings out of the kerf, and thereby minimizing and retarding wear and undercutting of the edge of the core. The spacing of the buttons is such that when the saw is rotated at selected speeds, the area of influence of each button lying behind the button (depending upon direction of rotation) extends to and includes the next adjacent button. Thus it will be understood that the buttons may be positioned centrally between the slots or at other points adjacent the edge of the core. Preferably the buttons are positioned in close proximity to the cutting elements so as to flush out cuttings deep in the cut being made. Obviously additional buttons may be spaced a selected distance from the cutting element to flush out cuttings which may be contacted thereby. Undercutting of the core about its entire circumference is thus substantially prevented.

It will also be understood that the buttons may be of virtually any shape such as circular, square, rectangular, or triangular as long as they serve to deflect and flush out cut material from the kerf and away from the core.

Other modifications and changes may be made within the spirit of this invention, and all such changes coming within the scope of the appended claims are embraced thereby.

I claim:

1. A circular saw construction including a circular disc-like core of substantially uniform thickness provided with an interrupted edge defined by a plurality of slots extending radially inwardly from said edge; a plurality of cutting segments secured to the edge of the core between said slots and projecting from side surfaces of said core; and means carried by the core adjacent and radially inwardly of each cutting segment for agitating and flushing cut material away from said core, said means comprising circumferentially spaced buttons projecting from said side surfaces of the core for approximately but not greater than the same distance as said cutting segments, said buttons being spaced from said slots.

2. A saw construction including a circular disc-like core having side surfaces and provided with a plurality of slots extending radially inwardly from the circumferential edge of the core; a plurality of cutting segments secured to the edge of the core between said slots and extending outwardly beyond said side surfaces; and means carried by the core adjacent and radially inwardly of each cutting segment, said means including spaced buttons extending from said side surfaces a distance not greater than the projection of said cutting segments therefrom.

3. A saw construction as stated in claim 2 wherein said buttons are made of hardened metal.

4. A saw construction as stated in claim 3 wherein said buttons are made of a resilient material.

5. A saw construction comprising: a core member having side surfaces terminating in a peripheral edge; a plurality of cutting elements carried by the core member at the peripheral edge, each cutting element including metal and diamond particles compressed and sintered together, each cutting element having uniform thickness, of polygonal section, and having side faces outwardly spaced from the side surfaces on said core member; said core member being provided with slots interrupting the peripheral edge between said cutting elements; and hardened elements carried by the core member adjacent the peripheral edge and having an inner edge spaced closer to the center of the core member than inner edge portions of the cutting elements.

6. A saw construction comprising a circular disc-like core of substantially uniform thickness provided with a plurality of slots extending radially inwardly from the edge of the core; a plurality of arcuate cutting elements secured at said edge and disposed individually between said slots and projecting laterally from the planes of the sides of the core; and auxiliary element means carried by and projecting laterally from the planes of the sides of the core to a distance not greater than the planes of the lateral radial sides of the cutting elements, said auxiliary element means being arranged adjacent to at least one radial end of certain of said cutting elements and extending radially inwardly of its respective cutting element for agitating and flushing cut material away from said core.

7. A saw construction as stated in claim 6 wherein each of said auxiliary element means comprises a hardened element extending across an edge wall of each slot and projecting from the planes of the sides of the core approximately the same distance as the cutting elements.

8. A saw construction as stated in claim 6 wherein said auxiliary element means are spaced circumferentially from said slots.

9. A saw construction as stated in claim 6 wherein said cutting elements include metal and diamond particles compressed and sintered together.

10. A saw construction as stated in claim 6 wherein said auxiliary element means are made of hardened metal.

11. A saw construction comprising a disc-like core of substantially uniform thickness; a plurality of arcuate cutting elements secured to the edge of said core in circumferentially spaced relation and projecting outwardly from the planes of the side surfaces of the core; auxiliary element means carried by the core adjacent to at least one radial end of certain of said cutting elements, said auxiliary element means projecting outwardly from the planes of the side surfaces of the core to a distance not greater than the planes of the lateral radial sides of the cutting elements.

*12. A saw construction adapted for cutting concrete comprising: a disk-like core member having side surfaces terminating in a peripheral edge; a plurality of cutting elements carried in a circumferentially spaced relation at the peripheral edge, each cutting element including diamond particles in compressed and sintered powdered metal, each cutting element being of polygonal section and of uniform thickness and having a major dimension extending circumferentially of the core member and side faces outwardly spaced from the side surfaces of said core member, said core member being provided with slots interrupting the peripheral edge between said cutting elements; and hardened elements carried by the core member, each hardened element having a face in alignment with a wall of a slot, and extending from ad-*

*jacent an inner edge portion of the cutting element toward the center of the core member.*

*13. A saw construction adapted for cutting concrete comprising: a disk-like core member having side surfaces terminating in a peripheral edge; a plurality of cutting elements carried in circumferentially spaced relation at the peripheral edge, each cutting element including diamond particles in compressed and sintered powdered metal, each cutting element being of polygonal section and of uniform thickness and having a major dimension extending circumferentially of the core member and side faces outwardly spaced from the side surfaces of said core member, said core member being provided with slots interrupting the peripheral edge between said cutting elements and provided with apertures adjacent the peripheral edge; and hardened elements carried by the core member in said apertures, each hardened element having a face in alignment with a wall of a slot, and extending from adjacent an inner edge portion of the cutting element toward the center of the core member.*

*14. A saw construction adapted for cutting concrete comprising: a disk-like core member having side surfaces terminating in a peripheral edge; a plurality of cutting elements carried in circumferentially spaced relation at the peripheral edge, each cutting element including diamond particles in compressed and sintered powered metal, each cutting element being of polygonal section and of uniform thickness and having a major dimension extending circumferentially of the core member and side faces outwardly spaced from the side surfaces of said core member, said core member being provided with slots interrupting the peripheral edge between said cutting elements, said core member being provided with spaced apertures adjacent the peripheral edge; and hardened elements carried by the core member in said apertures and having an inner edge spaced closer to the center of the core member than inner edge portions of the cutting elements.*

*15. A saw construction comprising: a core member having side surfaces terminating in a peripheral edge; a plurality of cutting elements carried by the core member at the peripheral edge, each cutting element including metal and diamond particles compressed and sintered together, each cutting element having uniform thickness of polygonal section, and having side surfaces outwardly spaced from the side surfaces on said core member; said core member being provided with slots interrupting the peripheral edge between said cutting elements; and hardened elements carried by the core member adjacent the peripheral edge at walls of said slots and having an inner edge spaced closer to the center of the core member than inner edge portions of the cutting elements.*

References Cited in the file of this patent or the original patent

UNITED STATES PATENTS

| | | |
|---|---|---|
| 298,353 | Crump et al. | May 13, 1884 |
| 940,420 | Ayers et al. | Nov. 16, 1909 |
| 2,064,407 | Bird | Dec. 15, 1936 |
| 2,071,618 | Ferrari et al. | Feb. 23, 1937 |
| 2,126,382 | Goff et al. | Aug. 9, 1938 |

FOREIGN PATENTS

| | | |
|---|---|---|
| 542,054 | Great Britain | Dec. 23, 1941 |